(12) United States Patent
Porte et al.

(10) Patent No.: US 9,353,648 B2
(45) Date of Patent: May 31, 2016

(54) PANEL FOR THE ACOUSTIC TREATMENT COMPRISING HOT AIR DUCTS AND AT LEAST ONE ANNULAR CHANNEL

(71) Applicants: Alain Porte, Colomiers (FR); Frédéric Chelin, Encausse (FR); Grégory Albet, Toulouse (FR)

(72) Inventors: Alain Porte, Colomiers (FR); Frédéric Chelin, Encausse (FR); Grégory Albet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 795 days.

(21) Appl. No.: 13/573,802

(22) Filed: Oct. 3, 2012

(65) Prior Publication Data

US 2013/0224000 A1 Aug. 29, 2013

(30) Foreign Application Priority Data

Oct. 3, 2011 (FR) ..................................... 11 58896

(51) Int. Cl.
*B64D 15/04* (2006.01)
*F01D 25/24* (2006.01)
(Continued)

(52) U.S. Cl.
CPC ................. *F01D 25/24* (2013.01); *B64D 15/04* (2013.01); *B64D 33/02* (2013.01); *F02C 7/045* (2013.01);
(Continued)

(58) Field of Classification Search
CPC ......... F01D 25/02; F01D 25/10; F01D 25/14; F01D 25/24; B64D 15/02; B64D 15/04; B64D 33/02; B64D 2033/0206; B64D 2033/0266; F02C 7/045; F02C 7/24; F02C 7/047; B64C 7/02
See application file for complete search history.

(56) References Cited

U.S. PATENT DOCUMENTS 3,933,327 A 1/1976 Cook et al.
5,429,407 A 7/1995 Buchheit et al.
(Continued)

FOREIGN PATENT DOCUMENTS

FR 2917067 12/2008
FR 2941675 8/2010
FR 2952032 5/2011

OTHER PUBLICATIONS

French Search Report for Serial Application No. 1158893 dated May 30, 2012.
(Continued)

*Primary Examiner* — Dwayne J White
*Assistant Examiner* — Danielle M Christensen
(74) *Attorney, Agent, or Firm* — Jenkins, Wilson, Taylor & Hunt, P.A.

(57) ABSTRACT

An aircraft nacelle comprising a lip extended by an inner conduit forming an air intake, a front frame delimiting with said lip an annular channel wherein hot air circulates, as well as a panel for acoustic treatment comprising, from outside inwardly, an acoustic resistive layer, at least one honeycomb structure, and a reflective layer, as well as ducts for channeling hot air with each one inlet communicating with the annular channel and one outlet communicating with the inner conduit, wherein the panel for acoustic treatment comprises, upstream from the ducts, an annular channel which extends over at least a portion of the nacelle circumference, at least one conduit providing communication between said annular channel and the upstream annular channel, and a plurality of ducts that open into said downstream annular channel, the panel for acoustic treatment being connected to the front frame in regard to the annular channel.

12 Claims, 6 Drawing Sheets

(51) Int. Cl.
*B64D 33/02* (2006.01)
*F02C 7/045* (2006.01)
*F02C 7/24* (2006.01)

(52) U.S. Cl.
CPC ........... *F02C 7/24* (2013.01); *B64D 2033/0206* (2013.01); *B64D 2033/0233* (2013.01); *F05D 2260/96* (2013.01); *Y02T 50/672* (2013.01)

(56) References Cited

U.S. PATENT DOCUMENTS

| | | | |
|---|---|---|---|
| 5,841,079 | A | 11/1998 | Parente |
| 7,588,212 | B2 | 9/2009 | Moe |
| 2008/0179448 | A1 | 7/2008 | Layland |
| 2009/0014234 | A1 | 1/2009 | Bagnall |
| 2010/0181420 | A1* | 7/2010 | Porte ................. B64D 33/02 244/1 N |
| 2010/0252685 | A1 | 10/2010 | Porte |
| 2010/0314082 | A1 | 12/2010 | Porte et al. |
| 2011/0131945 | A1 | 6/2011 | Vauchel |
| 2011/0133025 | A1 | 6/2011 | Vauchel |
| 2012/0261521 | A1 | 10/2012 | Porte |
| 2012/0317782 | A1 | 12/2012 | Porte |
| 2013/0098471 | A1 | 4/2013 | Porte et al. |
| 2014/0001284 | A1 | 1/2014 | Porte et al. |

OTHER PUBLICATIONS

Non-Final Office Action for U.S. Appl. No. 13/573,784 dated Mar. 27, 2015.
Non-Final Office Action for U.S. Appl. No. 13/632,820 dated May 11, 2015.
Final Office Action for U.S. Appl. No. 13/632,820 dated Nov. 19, 2015.
Notice of Allowance for U.S. Appl. No. 13/573,784 dated Sep. 23, 2015.
Advisory Action for or U.S. Appl. No. 13/632,820 dated Feb. 3, 2015.
Non-Final Office Action for U.S. Appl. No. 13/632,820 dated Mar. 25, 2016.

* cited by examiner

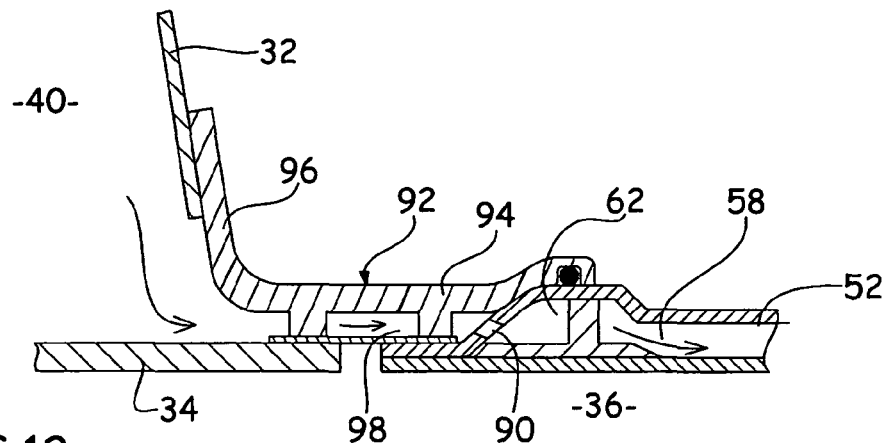
FIG.12
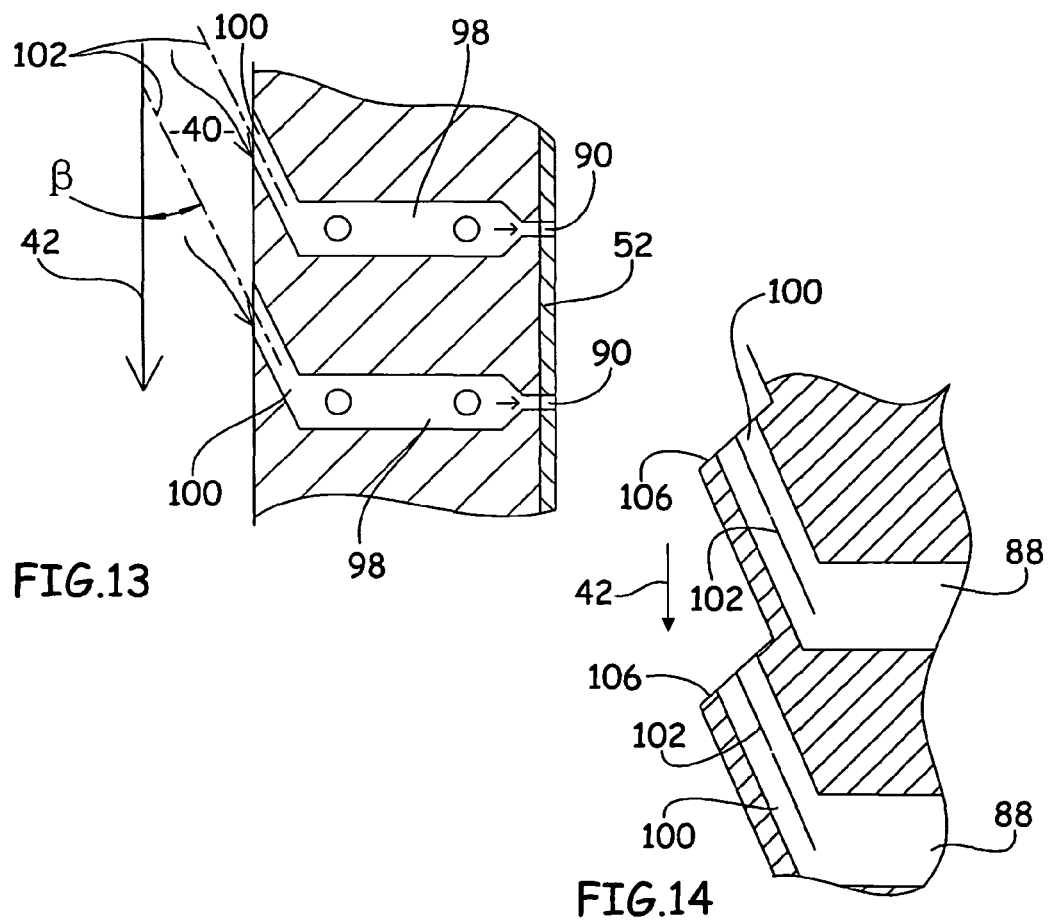
FIG.13
FIG.14

PANEL FOR THE ACOUSTIC TREATMENT COMPRISING HOT AIR DUCTS AND AT LEAST ONE ANNULAR CHANNEL

TECHNICAL FIELD

The present invention relates to a panel for acoustic treatment comprising hot air ducts and at least one annular channel.

BACKGROUND

An aircraft propulsion unit comprises a nacelle in which a traction system is arranged in a substantially concentric fashion.

SUMMARY

As shown in FIG. 1, nacelle 10 includes in the front air intake 12 for channeling airflow towards the traction system.

Following a longitudinal section (containing the traction system rotation axis), air intake 12 includes lip 14 extending outside the nacelle through outer wall 16 and inside through inner wall 18 defining inner conduit 20 for channeling air in the direction of the traction system.

Said nacelle also includes front frame 22 which defines, with lip 14, annular channel 24 which may be used to channel hot air for frost treatment.

In order to limit noise impact, techniques have been developed to reduce internal noise, including by providing, on the walls of inner conduit 20, panels or coatings to absorb some of the acoustic energy, namely using Helmholtz resonator principle.

In order to optimize acoustic treatment, such panels should cover the largest area. Some of panels 26 for acoustic treatment may cover inner conduit 20, those panels distant from the front frame have no frost treatment function. Others may be arranged inside annular channel 24 at the front of frame 22 and may combine acoustic and frost treatment functions. Finally, a panel 28 for acoustic treatment with heat resistant materials may be interposed between front frame 22 and panels 26. Such panel 28 is also capable of frost treatment and includes means to capture hot air into annular channel 24 and to discharge it back into inner conduit 20.

Such a panel combining acoustic and frost treatment functions has been described in patent FR 2,917,067. It comprises, from outside inwardly, an acoustic resistive layer, at least one honeycomb structure and a reflective layer, as well as ducts each delimited by a wall interposed between the acoustic resistive layer and the honeycomb structure.

This solution may reduce the risk of communication between the interior of the ducts and the honeycomb structure cells, and thus the risk of disturbing acoustic treatment.

According to another advantage, hot air has a volume significantly less compared to prior solutions whereby it occupies the volume of some honeycomb structure cells, which provides, on the one hand, a better hot air concentration against the wall to be defrosted, increasing defrosting efficiency, and, on the other hand, a higher air pressure limiting the risk of a pressure within the structure less than the external pressure, and thus of external air penetrating inside the defrost system.

According to another advantage, hot air is in constant contact with the skin to be defrosted, which can improve exchange and reduce the temperature of hot air pushed rearwardly at the defrost system outlet, which would reject it without risking to burn the wall crossed, especially when the latter is made of a heat sensitive material such as a composite.

In general, each duct is intended to drive hot air communicates through a first end with the annular channel and opens via an opening into inner conduit 20. These ducts extend in the longitudinal direction and are distributed over the entire circumference of inner conduit 20.

At the level of annular channel 24, hot air is generally injected at a point of the circumference and flows into the annular channel revolving several times. Means are provided to homogenize the air temperature inside of the annular channel. In order to transfer hot air from the annular channel to the ducts, it is necessary to provide an insert which functions as junction between the wall defining the lip, the front frame, and the panel for acoustic treatment 28. This part includes ducts for channeling hot air from the annular channel to the acoustic panel ducts. The insert and its assembly are relatively complex because the conduits of this piece need to be aligned with the panel conduits for acoustic treatment. According to one embodiment, this part is in the form of a plate with grooves on its side facing the acoustic resistive layer, each groove defining a conduit. According to another constraint, it is necessary to reduce the size of the surfaces acoustically untreated in order to optimize acoustic treatment. Thus, the present invention aims to overcome the drawbacks of the prior art by providing a panel for acoustic treatment incorporating ducts for frost treatment function, with an annular channel for channeling hot air in the direction of the ducts so as to simplify their design.

To this end, the invention relates to an aircraft nacelle comprising a lip extended by an inner conduit forming an air intake, a front frame delimiting with said lip an annular channel through which hot air flows, as well as a panel for acoustic treatment comprising, from outside inwardly, an acoustic resistive layer, at least one honeycomb structure, and a reflective layer, as well as ducts for channeling hot air, each with an inlet communicating with the annular channel and an outlet communicating with the inner conduit, wherein the panel for acoustic treatment comprises, upstream from the ducts, an annular channel which extends over at least a portion of the nacelle circumference, at least one conduit providing communication between said annular channel and the upstream annular channel, and a plurality of ducts opening into said downstream annular channel, the panel for acoustic treatment being connected to the front frame in regard to the annular channel.

BRIEF DESCRIPTION OF THE DRAWINGS

Other features and advantages will become apparent from the following description of the invention, description provided as an example only, with reference to the accompanying drawings in which:

FIG. 12 is a longitudinal section view of another embodiment of the duct inlets of the panel for acoustic treatment according to the invention, FIG. 13 is a cross-section along the circumference of the duct inlets shown in FIG. 12, and FIG. 14 is a cross-section along the circumference of a variant of the embodiment shown in FIG. 13.

DETAILED DESCRIPTION

Figure 1:
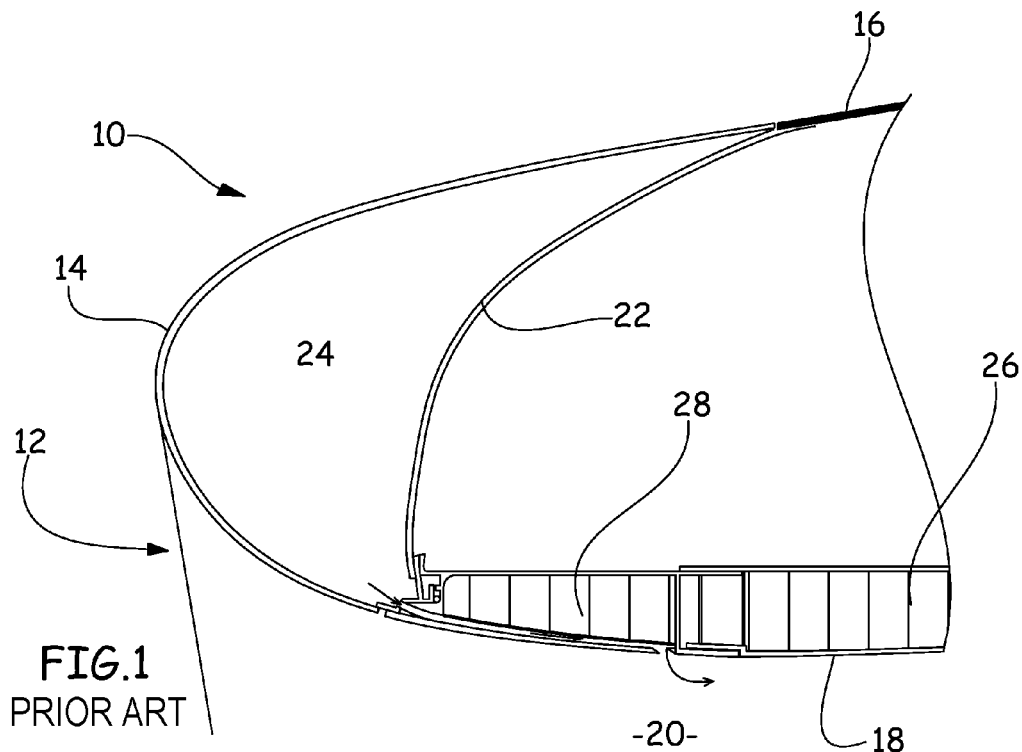
FIG. 1 is a longitudinal section of a portion of an air intake according to prior art.
Figure 2:
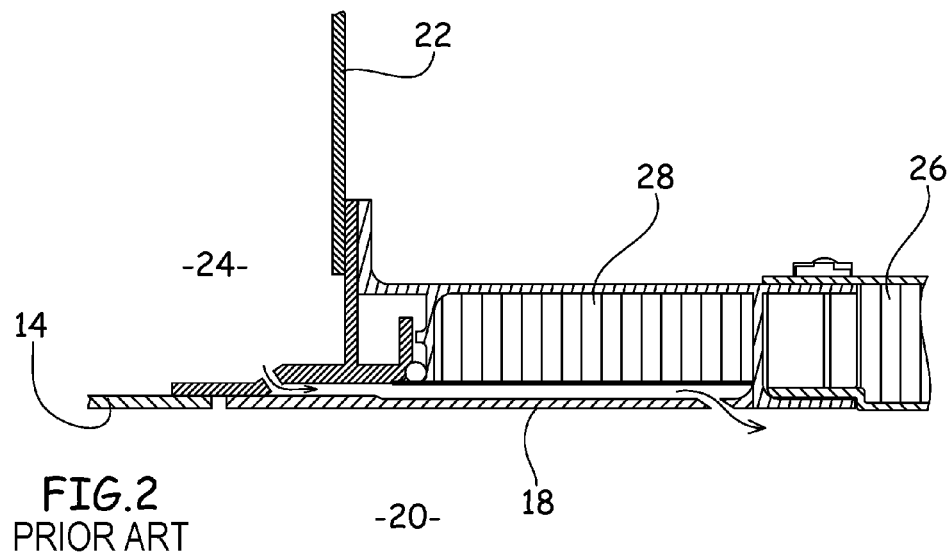
FIG. 2 is a cross-section view illustrating in detail a panel for acoustic treatment according to prior art.
Figure 3:
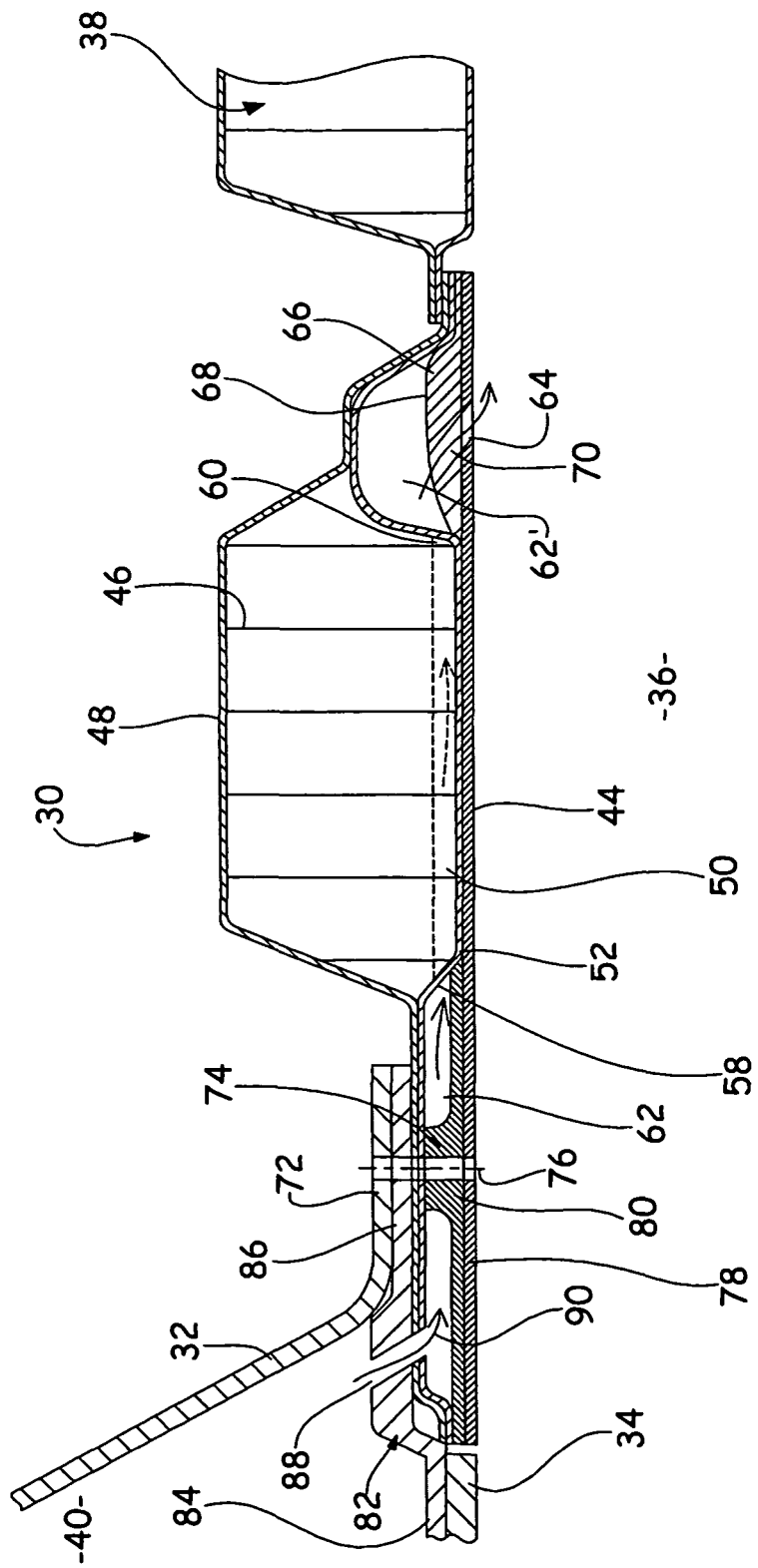
FIG. 3 is a cross-section view of a portion of an air intake according to the invention.
Figure 4A:
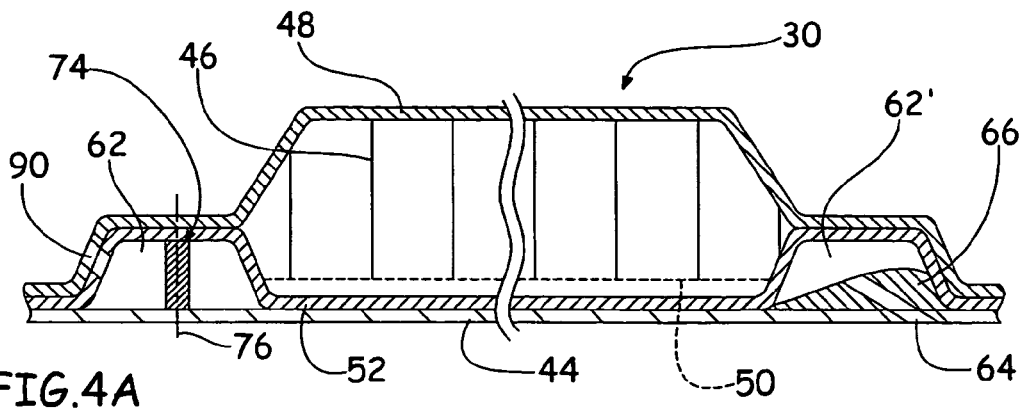
FIG. 4A is a longitudinal section along a first cross-section plane of a panel for acoustic treatment according to the invention.
Figure 4B:
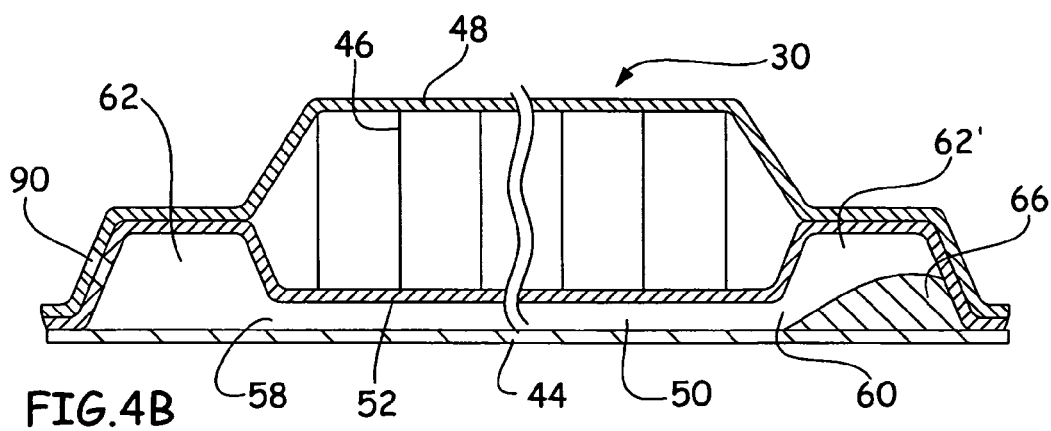
FIG. 4B is a longitudinal section along a second plane of a panel for acoustic treatment according to the invention.

In FIG. 3, panel 30 for acoustic treatment is illustrated arranged in the rear of front frame 32 of an air intake of which part of lip 34 and the front of inner conduit 36 are illustrated. Advantageously, in the rear of panel 30, inner conduit 36 is defined by a panel for acoustic treatment 38 without frost treatment typically made of composite material.

For the remainder of the description, a longitudinal plane is a plane containing the longitudinal axis corresponding approximately to the rotating axis of the traction system. A transverse plane is a plane perpendicular to the longitudinal axis. In addition, the front of panel 30 corresponds to the portion of the panel facing the lip, while the rear of panel 30 corresponds to the portion facing the nacelle outlet.

According to the invention, in order to ensure frost treatment, hot air is injected into annular channel 40 delimited by lip 34 and front frame 32. Hot air flows into the annular channel by rotating approximately around the longitudinal axis, in a direction indicated by arrows 42 in FIGS. 9, 10, 11, 13, and 14.

For the remaining description, the panel for acoustic treatment 38, the front frame, the lip, the means for injecting hot air into the annular channel are no longer detailed because they are known to the skilled person.

In a known manner, the panel for acoustic treatment 30 comprises, from outside inward, one acoustic resistive layer 44, at least one honeycomb structure 46 and one reflective layer 48, and ducts 50 which extend from the front of the panel to the rear of the panel. Advantageously, ducts 50 are delimited by at least one wall interposed between acoustic resistive layer 44 and honeycomb structure 46.

Figure 5:
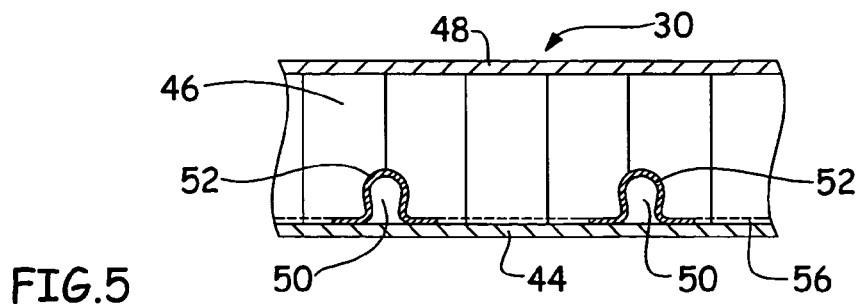
FIG. 5 is a cross-section along a first plane of a panel for acoustic treatment according to the invention.
Figure 6:
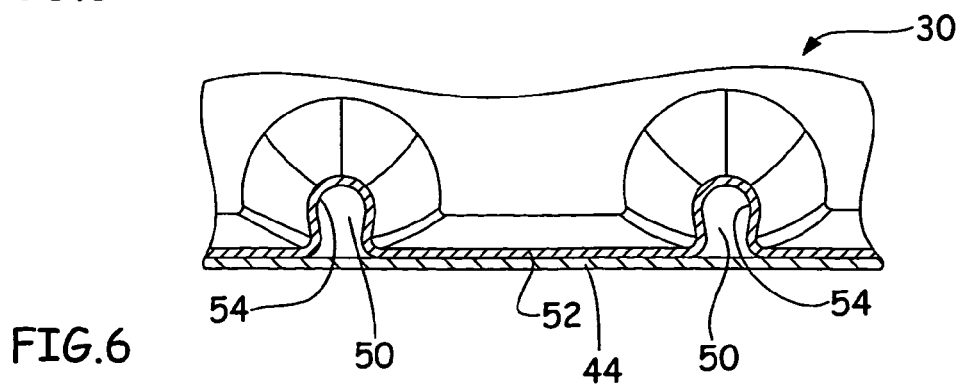
FIG. 6 is a cross-section along a second plane of a panel for acoustic treatment according to the invention.

According to one embodiment, ducts 50 are produced as described in document FR-2.917.067. However, the invention is not limited to the embodiment illustrated in this document. Thus, wall 52 may be formed with grooves 54 so as to define ducts 50 when pressed against acoustic resistive layer 44. Said wall 52 may comprise lightening holes 56 between ducts 50 in order to reduce material thickness crossed by acoustic waves, as shown in FIG. 5.

The shaping of wall 52, the assembling of acoustic resistive layer 44 and of wall 52, the embodiment of lightening holes 56, and the assembling the honeycomb structure and the reflective layer are not further detailed since various technical solutions may be considered.

According to one embodiment, ducts 50 extend approximately along the longitudinal direction. Alternatively, ducts 50 may have a helical shape.

Each duct 50 includes an inlet 58 connected to annular channel 40 and an outlet 60 connected to inner conduit 36. According to the invention, the panel comprises, upstream from ducts 50, annular channel 62 which extends over at least a portion of the nacelle circumference, at least one conduit providing communication between said annular channel 62 and upstream annular channel 40, and multiple ducts 50 opening downstream into said annular channel 62. Providing an annular channel simplifies the design since the conduit(s) communicating with annular channel 40 are not necessarily aligned with ducts 50.

Preferably, inlets 58 and/or outlets 60 of ducts 50 open into annular channel(s) 62, 62' with a flared shape.

Advantageously, annular channel 62 extends around the entire periphery of the nacelle.

Preferably, said annular channel 62 has a section greater than that of ducts 50 so as to homogenize frost treatment over the circumference of inner conduit 36. In order to ensure satisfactory mixing of, and to reduce disparities in, temperature and/or pressure along the circumference, annular channel 62, also called stabilizing chamber, has a cross-section greater than or equal to 1.5 times the area of one duct 50. Preferably, the annular channel has a trapezoidal cross-section in a longitudinal plane, the large base being oriented toward acoustic resistive layer 44.

Advantageously, annular channel 62 comprises a plurality of inlets connected to annular channel 40 and a plurality of outlets connected to ducts 50, and inlets and outlets are not aligned in the longitudinal direction but offset circumferentially. This arrangement contributes to obtain a better hot air mixing and to homogenize its temperature or pressure before hot air passes through ducts 50.

Preferably, annular channel 62 may be provided upstream from ducts 50 and/or annular channel 62' downstream from ducts 50.

According to one embodiment, each annular channel 62, 62' is limited by a wall and acoustic resistive layer 44.

Advantageously, annular channels 62, 62' and ducts 50 are delimited by the same wall 52. This wall is shaped by any appropriate means, including by forming.

According to one embodiment, wall 52 is in contact with acoustic resistive layer 44 upstream from annular channel 62 positioned upstream from ducts 50, and downstream from annular channel 62' positioned downstream from ducts 50. In addition, reflective layer 48 is pressed against wall 52 at the level of annular channels 62, 62'.

Figure 7A:
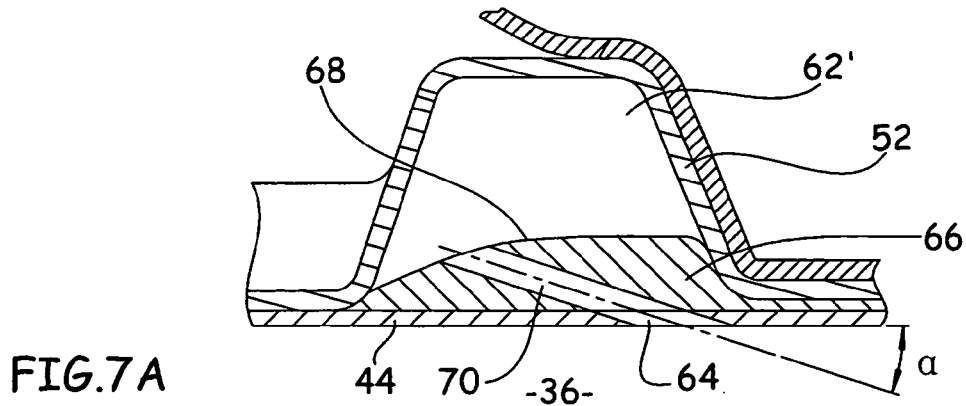
FIG. 7A is a longitudinal section view illustrating in detail a stabilizing chamber located at the rear of the panel for acoustic treatment according to the invention.
Figure 7B:
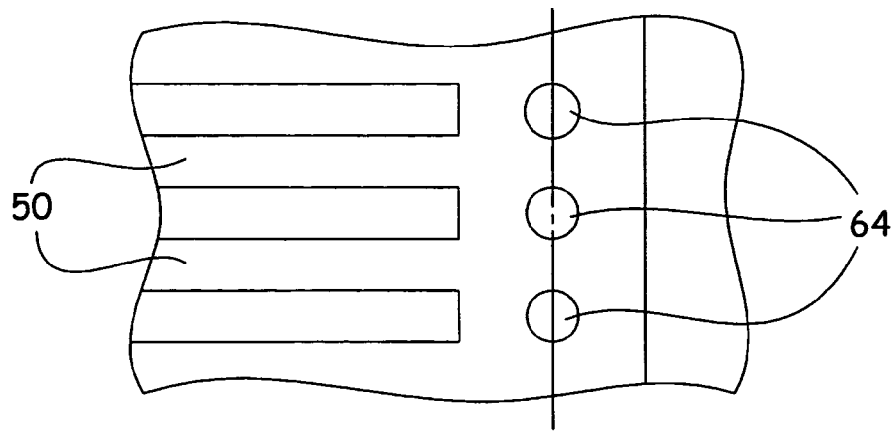
FIG. 7B is a diagram illustrating the distribution along the circumference of hot air ducts and outlets of the panel for acoustic treatment according to the invention.

At the level of annular channel 62' provided downstream from duct 50, acoustic resistive layer 44 includes ports 64. As illustrated in FIG. 7B, to ensure better temperature homogenization, outlet ports 64 are not aligned on but offset with regards to ducts 50. Preferably, one outlet port 64 is arranged between two areas extending from adjacent ducts.

Advantageously, annular channel 62' includes means for tilting the air exiting through outlet ports 64 and thus limiting air flow disturbances inside inner conduit 36. To this end, the panel comprises a wedge 66 pressed against the inner surface of acoustic resistive layer 44 and which upper surface 68 defines, with wall 52, annular channel 62'. Said wedge 66 comprises, for each output port 64, a conduit 70 for communication between annular channel 62' and matching outlet 64. Advantageously, each conduit 70 forms an angle α of less than 50° with the outer surface of the acoustic resistive layer located beyond matching outlet.

In order to facilitate air flow, top surface 68 of wedge 66 includes an upstream chamfered shape into which conduits 70 open.

In order to simplify the air circuit and to minimize acoustically untreated surfaces, the acoustic panel according to the invention is connected to the front frame through annular channel 62.

To this end, front frame 32 includes a rearwardly curved edge 72 pressed against the inner surface of reflective layer 48, itself pressed against wall 52 in regard to annular channel 62 positioned upstream from ducts 50. In order to reduce the risk of crushing annular channel 62, at least one wedge 74 is arranged inside annular channel 62 in regard to each means 76 providing a link between front frame 32 and the panel for acoustic treatment 30 according to the invention. In a transverse plane, wedges 74 are spaced along the circumference so as to let hot air pass from annular channel 40 to ducts 50.

According to a simplified embodiment, each wedge 74 is shaped as a tube whose axis is in line with that of connecting means 76, its height being equal to the height of annular channel 62.

Alternatively, in order to simplify mounting, the panel may include at the level of annular channel 62 positioned upstream from ducts 50, a material strip 78 which extends over at least a portion of the circumference, pressed against acoustic resistive layer 44 and including, for each connecting means 76 an embossment 80 shaped as a hollow cylinder which functions as wedge 74. Thus, according to this embodiment, several wedges 74 are connected by material strip 78.

Preferably, the panel for acoustic treatment 30 is connected to the wall defining lip 34.

To this end, an annular part 82 provides connection between, on the one hand, the wall defining lip 34, and, on the other hand, acoustic panel 30 and advantageously front frame 32.

Depending on the case, annular part 82 may be mono-block and extend over the entire periphery of the nacelle, or be obtained from assembling several angular sectors.

Figure 8:
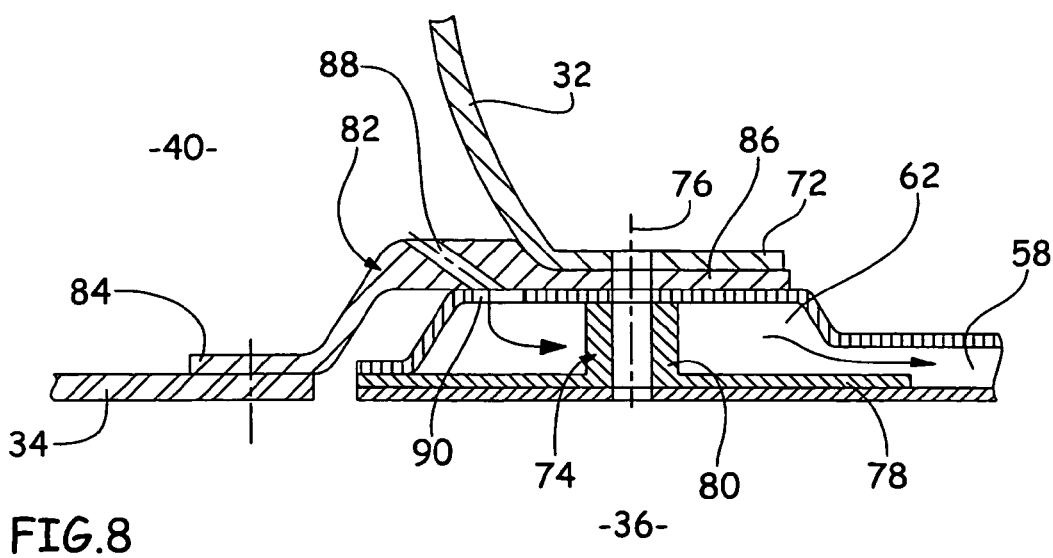
FIG. 8 is a longitudinal section view illustrating in detail one embodiment of a stabilizing chamber provided in the front of a panel for acoustic treatment.

According to a particular embodiment illustrated in FIG. 8, annular part 82 has, at one end, a first portion 84 formed as an annular band pressed and attached against the inner surface of the wall forming lip 34, and the other end, a second portion 86 formed as a band placed between bent edge 72 of front frame 32 and the wall defining annular channel 62 of acoustic panel 30, second portion 86 being offset radially and outwardly relative to first portion 84 so that the outer surface of acoustic panel 30 is in line with the outer surface of the wall that defines lip 34.

This annular part 82 comprises a plurality of conduits 88 for communication between annular channel 40 and inlet 90 of annular channel 62 located upstream from acoustic panel 30.

Whatever the panel for acoustic treatment 30, the air intake comprises at least one conduit for channeling hot air from annular channel 40 to the panel for acoustic treatment 30.

In a first embodiment, shown in FIGS. 8 to 11, annular part 82 described above includes conduits 88.

According to another embodiment, illustrated in FIGS. 12 and 14, insert 92 can bridge the gap between front frame 32, the wall defining lip 34, and acoustic panel 30. Said insert 92 comprises annular body 94 with, in the front, bent plate 96 that can be pressed and secured against the rear face of front frame 32.

In this variant, the wall defining lip 34 and the front end of the acoustic panel are pressed and secured to the bottom face (oriented toward the longitudinal axis of the nacelle) by any suitable means. On its bottom face, annular body 94 comprises recessed shapes which define conduits 98.

However, the invention is not limited to these two variants for conduits delivering hot air from the annular channel to the panel for acoustic treatment. Thus, other conduit shapes or other solutions to define a conduit may be considered.

Each feeding conduit 88 and 98 comprises a portion called opening 100 that opens into annular channel 40.

According to the invention, opening 100 is for channeling hot air in a direction referenced as 102 forming an angle β of less than 60° with hot air flow direction 42 in the annular channel. Such arrangement ensures to capture a larger hot air flow.

Figure 9:
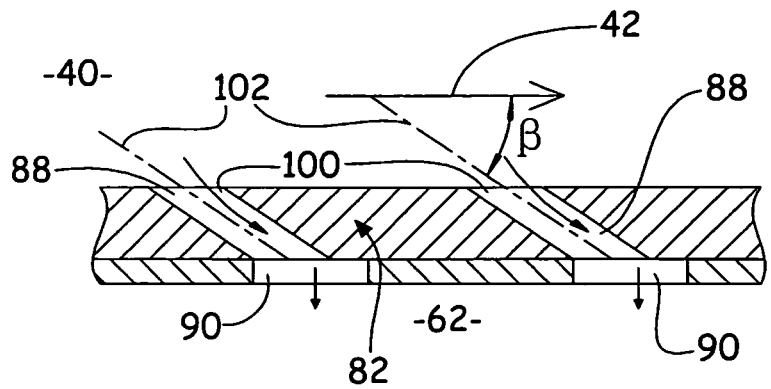
FIG. 9 is a cross-section of an embodiment of the duct inlets of the panel for acoustic treatment according to the invention.
Figure 10:
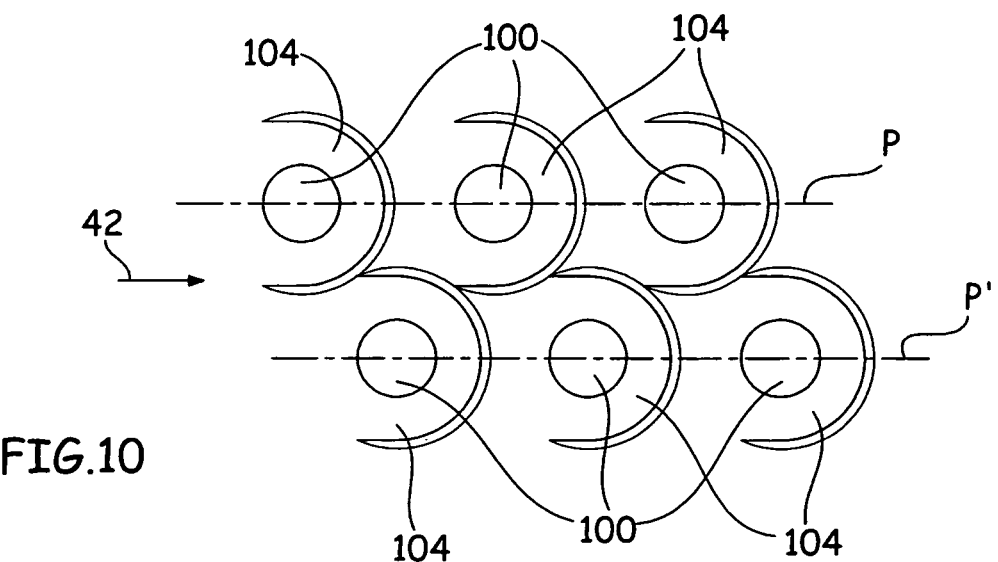
FIG. 10 is a view from inside the annular channel of another embodiment of the duct inlets of the panel for acoustic treatment according to the invention.
Figure 11:
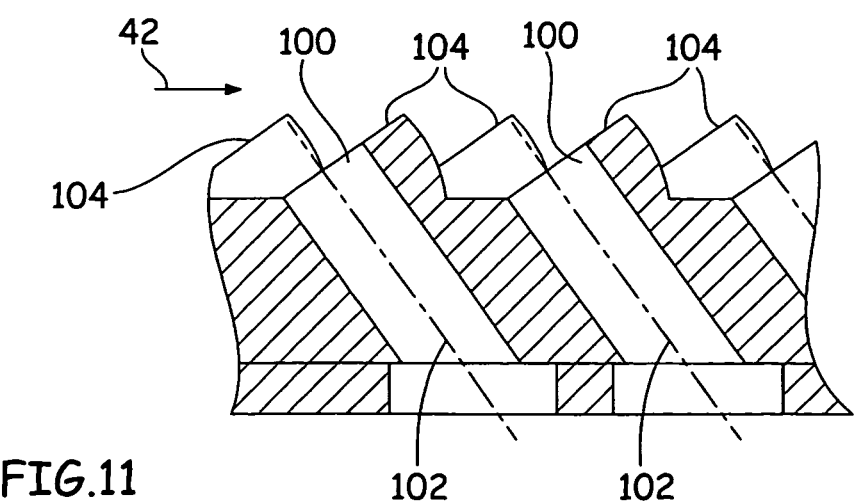
FIG. 11 is a cross-section of the embodiment shown in FIG. 10.

According to particular variations illustrated in FIGS. 9 to 11, conduits 88 have an opening 100 whose direction 102 is contained in a plane perpendicular to the nacelle longitudinal axis.

According to a first variant illustrated in FIG. 9, openings 100 are arranged in a same transverse plane.

In another embodiment illustrated in FIGS. 10 and 11, openings 100 are arranged in at least two transverse planes P, P'. Preferably, openings 100 are distributed over two planes P, P', and staggered.

According to a preferred embodiment, openings 100 open on surfaces 104 intersecting with hot air flow direction 42 in the annular channel. Advantageously, surfaces 104 are perpendicular to direction 102 of the conduits.

In other embodiments illustrated in particular in FIGS. 13 and 14, conduits 98 have an opening 100 which direction 102 is secant with the plane perpendicular to the nacelle longitudinal axis and substantially tangent to the nacelle inner conduit circumference. In this case, openings 100 are arranged on the inner surface of the wall defining lip 34. According to one embodiment, in order to form the conduits, one part is pressed against the inner face of the wall defining lip 34, said part having grooves that each defines a conduit. The wall defining lip 34 being curved, a component of direction 102 of opening 100 of the conduits is directed towards the nacelle longitudinal axis.

According to one embodiment illustrated in FIG. 13, openings 100 are arranged in a plane parallel to hot air flow direction 42 in the annular channel. In another embodiment illustrated in FIG. 14, openings 100 open on surfaces 106 secant with hot air flow direction 42 in the annular channel. Advantageously, surfaces 106 are perpendicular to direction 102 of the conduits.

The invention claimed is:
1. An aircraft nacelle comprising:
a lip extended by an internal conduit forming an air intake;
a front frame defining with said lip an annular channel through which hot air circulates, as well as a panel for acoustic treatment comprising:
an acoustic resistive layer;
at least one honeycomb structure disposed over the acoustic resistive layer;
a reflective layer disposed over the at least one honeycomb structure; and
ducts for channeling hot air, each duct having an inlet communicating with the annular channel and an outlet communicating with the internal conduit, wherein the panel for acoustic treatment comprises a downstream annular channel which extends over at least a portion of a nacelle circumference;

wherein at least one conduit provides communication between said downstream annular channel and the annular channel, wherein the ducts open into said downstream annular channel, wherein the panel for acoustic treatment is connected to the front frame, and wherein the downstream annular channel and the ducts are delimited by a common wall shaped and pressed against the acoustic resistive layer.

2. The aircraft nacelle according to claim 1, wherein at least one wedge is positioned in the downstream annular channel for limiting the crushing risk.

3. The aircraft nacelle according to claim 2, wherein the front frame comprises a rearwardly bent edge pressed onto the wall delimiting the downstream annular channel, and wherein the at least one wedge is arranged inside the downstream annular channel in regard to a connection between the front frame and the panel for acoustic treatment.

4. The aircraft nacelle according to claim 2, wherein a strip that extends over at least a portion of the nacelle circumference comprises an embossment which forms the at least one wedge.

5. The aircraft nacelle according to claim 1, wherein the downstream annular channel extends over the entire nacelle circumference.

6. The aircraft nacelle according to claim 1, wherein the downstream annular channel has a cross-section greater than or equal to a section of one duct.

7. The aircraft nacelle according to claim 6, wherein the downstream annular channel has a trapezoidal cross-section in a longitudinal plane, a large base of the trapezoidal cross-section being oriented toward the acoustic resistive layer.

8. The aircraft nacelle according to claim 1, wherein the downstream annular channel comprises several inlets and several outlets, the inlets and outlets being misaligned in a longitudinal direction but offset along the nacelle circumference.

9. An aircraft nacelle comprising:
a lip extended by an internal conduit forming an air intake;
a front frame defining with said lip an annular channel through which hot air circulates, as well as a panel for acoustic treatment, wherein the panel comprises:
an acoustic resistive layer;
at least one honeycomb structure disposed over the acoustic resistive layer;
a reflective layer disposed over the at least one honeycomb structure; and
ducts for channeling hot air, each duct having an inlet communicating with the annular channel and an outlet communicating with the internal conduit, wherein the panel for acoustic treatment comprises a downstream annular channel which extends over at least a portion of a nacelle circumference;
wherein at least one conduit provides communication between said downstream annular channel and the annular channel, wherein the ducts open into said downstream annular channel, wherein the panel for acoustic treatment is connected to the front frame, and wherein at least one wedge is positioned in the downstream annular channel for limiting the crushing risk;
and wherein the downstream annular channel and the ducts are delimited by a common wall shaped and pressed against the acoustic resistive layer.

10. The aircraft nacelle according to claim 9, wherein the front frame comprises a rearwardly bent edge pressed onto a wall delimiting the downstream annular channel, and wherein the at least one wedge is arranged inside the downstream annular channel in regard to a connection between the front frame and the panel for acoustic treatment.

11. The aircraft nacelle according to claim 9, wherein a strip that extends over at least a portion of the nacelle circumference comprises an embossment which forms the at least one wedge.

12. An aircraft nacelle comprising:
a lip extended by an internal conduit forming an air intake;
a front frame defining with said lip an annular channel through which hot air circulates, as well as a panel for acoustic treatment, wherein the panel comprises:
an acoustic resistive layer;
at least one honeycomb structure disposed over the acoustic resistive layer;
a reflective layer disposed over the at least one honeycomb structure; and
ducts for channeling hot air, each duct having an inlet communicating with the annular channel and an outlet communicating with the internal conduit, wherein the panel for acoustic treatment comprises a downstream annular channel which extends over at least a portion of a nacelle circumference;
wherein at least one conduit provides communication between said downstream annular channel and the annular channel, wherein the ducts open into said downstream annular channel, wherein the panel for acoustic treatment is connected to the front frame, and wherein the downstream annular channel comprises several inlets and several outlets, the inlets and outlets being misaligned in a longitudinal direction but offset along the nacelle circumference;
and wherein the downstream annular channel and the ducts are delimited by a common wall shaped and pressed against the acoustic resistive layer.

* * * * *